United States Patent
Yuasa et al.

(10) Patent No.: US 7,941,706 B2
(45) Date of Patent: May 10, 2011

(54) AUTONOMIC RESOLUTION OF SYSTEM CONFIGURATION

(75) Inventors: Hironori Yuasa, Yokohama (JP); Toshimichi Arima, Fujisawa (JP); Tomoko Murayama, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 437 days.

(21) Appl. No.: 11/926,968

(22) Filed: Oct. 29, 2007

(65) Prior Publication Data

US 2009/0112860 A1    Apr. 30, 2009

(51) Int. Cl.
*G06F 11/00* (2006.01)

(52) U.S. Cl. ............... 714/47; 714/25; 714/26; 714/31; 714/37

(58) Field of Classification Search .............. 714/25, 714/26, 31, 37, 47
See application file for complete search history.

(56) References Cited

U.S. PATENT DOCUMENTS

| | | | | |
|---|---|---|---|---|
| 5,796,633 | A * | 8/1998 | Burgess et al. | 702/187 |
| 7,237,023 | B2 * | 6/2007 | Menard et al. | 709/224 |
| 7,251,584 | B1 * | 7/2007 | Perazolo et al. | 702/183 |
| 7,379,846 | B1 * | 5/2008 | Williams et al. | 702/185 |
| 2008/0189578 | A1 * | 8/2008 | Raghuraman et al. | 714/47 |

FOREIGN PATENT DOCUMENTS

| | | |
|---|---|---|
| JP | 08-016519 | 1/1996 |
| JP | 2003296141 | 10/2003 |
| JP | 2006178720 | 7/2006 |

* cited by examiner

*Primary Examiner* — Michael C Maskulinski
*Assistant Examiner* — Charles Ehne
(74) *Attorney, Agent, or Firm* — Lieberman & Brandsdorfer, LLC (57) ABSTRACT

A method and apparatus are provided to support autonomic computing for system configuration. Common base events (CBEs) are generated and, based upon system configuration, are employed to monitor system resources and to resolve system configuration conflicts prior to an error. A symptom database stores a set of rules for the configuration information. The configurations CBEs for the system configuration are compared with the symptom rules, and any discrepancies between the two elements are communicated to a user prior to an occurrence of an error in the system. Accordingly, an autonomic computer system is provided to support system configuration data.

18 Claims, 10 Drawing Sheets

AUTONOMIC RESOLUTION OF SYSTEM CONFIGURATION

BACKGROUND OF THE INVENTION

1. Technical Field

This invention relates to an autonomic computer system configured to monitor system resource and system configuration information. More specifically, common base events are generated, and based upon system configuration, are employed to monitor system resources and to resolve system configuration conflicts.

2. Description of the Prior Art

Within the past two decades, the development of raw computing power coupled with the proliferation of computer devices has grown at exponential rates. This phenomenal growth, along with the advent of the Internet, has led to a new age of accessibility to other people, other systems, and to information.

The simultaneous explosion of information and integration of technology into everyday life has brought on new demands for how people manage and maintain computer systems. The demand for information technology professionals is already outpacing supply when it comes to finding support for someone to manage complex, and even simple computer systems. As access to information becomes omnipresent through personal computers, hand-held devices, and wireless devices, the stability of current infrastructure, systems, and data is at an increasingly greater risk. This increasing complexity, in conjunction with a shortage of skilled information technology professionals, points towards an inevitable need to automate many of the functions associated with computing today.

Autonomic computing is one proposal to solve this technological challenge. Autonomic computing is a concept of building a computer system that regulates itself much in the same way that a person's autonomic nervous system regulates and protects the person's body. In autonomic computing, the system is self healing, self configured, self protected, and self managed. An autonomic computing environment functions with a high level of artificial intelligence while remaining invisible to the users. The autonomic computing environment operates organically in response to the input it collects.

Among the tools employed in an autonomic computing environment to support the self management is a common base event. In today's complex world of e-business, multitudes of interconnected systems must work together to perform many of the simple housekeeping activities which are necessary to keep a computing system healthy. A small event in a computing system can change things far beyond the seeming initial circumstance. An event, which encapsulates message data sent as the result of an occurrence, or situation, represents the very foundation on which these complex systems communicate. Basic aspects of enterprise management, such as performance monitoring, security and reliability, as well as fundamental portions of e-business communications, such as order tracking, are grounded in the viability and fidelity of these events, in that quality data lends to accurate, deterministic and proper management of the enterprise. Effort to ensure the accuracy, improve the detail and standardize the format of these fundamental enterprise building blocks is an imperative towards designing robust, manageable and deterministic systems. Events exchanged between and among applications in complex information technology systems represent the very nervous system that allows these various facets of the system to interoperate, communicate and coordinate their activities. We therefore define here the Common Base Event (CBE) as a new standard for events amongst management and business enterprise applications. The purpose of the CBE is to facilitate the effective communication among disparate enterprise components that support logging, management, problem determination, autonomic computer, and e-business functions in an enterprise.

The CBE definition ensures completeness of data by providing properties to publish the identification of the component that is reporting the situation, the identification of the component that is affected by the situation, and the situation itself. All properties defined in the CBE model apply to one of these three broad categories. In addition, the location of the reporter and source components is also considered. The affected component might not reside in the same physical machine as the component that reports it. This broader scope of information encapsulates enough data so that events can be exchanged and interpreted in a deterministic and appropriate manner across multiple management systems that consume the events without losing fidelity due to serial hops among the multiple management systems.

It is known in the art, that the CBE functions in conjunction with other tools. A log and trace analyzer (LTA) is one of those tools. The LTA enables viewing, analysis, and correlation of log files generated by different products in the system. The LTA acts as an autonomic manager when configured to receive CBEs. It performs the monitoring and analysis parts of the control loop. A managed resource passes CBEs to the LTA, allowing the autonomic manager to monitor, analyze, and correlate this data.

Figure 1:
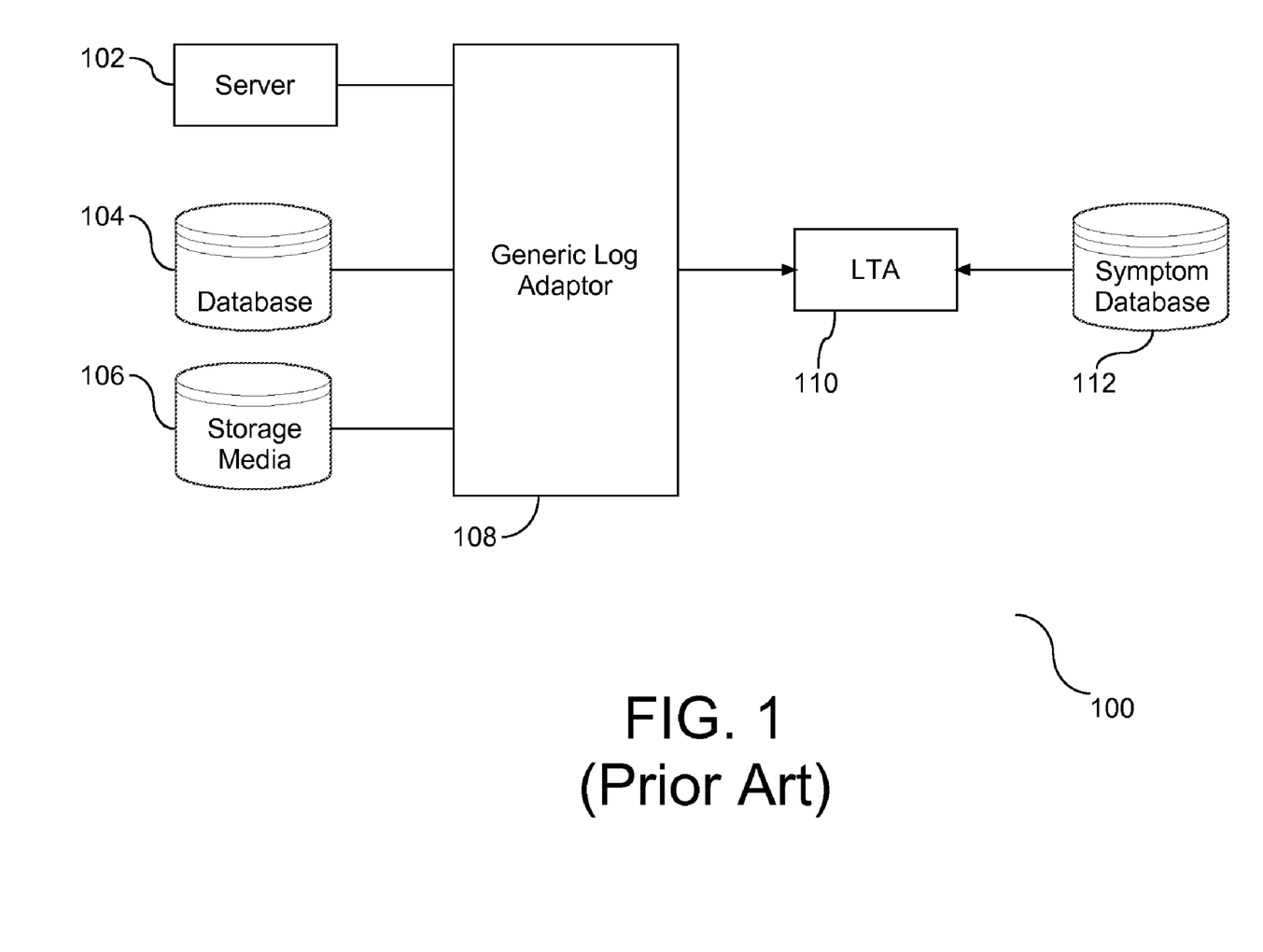
FIG. 1 is a prior art block diagram of an autonomic computing system.

FIG. 1 is a prior art block diagram (100) of the hardware components associated with autonomic computing and CBEs. The hardware components shown herein include a server (102), a database (104), and storage media (106). Each of the hardware components are in communication with a generic log adaptor (GLA) (108). The GLA (108) converts text based logs to the CBE format for use with autonomic computing tools. More specifically, the GLA (108) prepares logs for use by the log and trace analyzer (LTA) (110). The LTA (110) allows import of log files from multiple products, as well as determines the relationship between the events captured by these products. The LTA (110) is shown in communication with a symptom database (112). The symptom database (112) is a file of symptoms, string match patterns, associated solutions, and directives. The database (112) is used in the analysis of event and error messages that may occur in a log. In one embodiment, the database (112) records incident and problem indications that could arise in the operation of the software components in the system. For every symptom, the symptom database (112) also contains the likely cause of the problem and a recommended solution for the problem. In one embodiment, a symptom is an error or event message. It may have a solution associated with it in the symptom database. A solution is information about why an error or an event may have occurred and how to recover from it. Log records can be analyzed using a symptom database to interpret known events and error conditions, and to get detailed information on error resolution.

Figure 2:
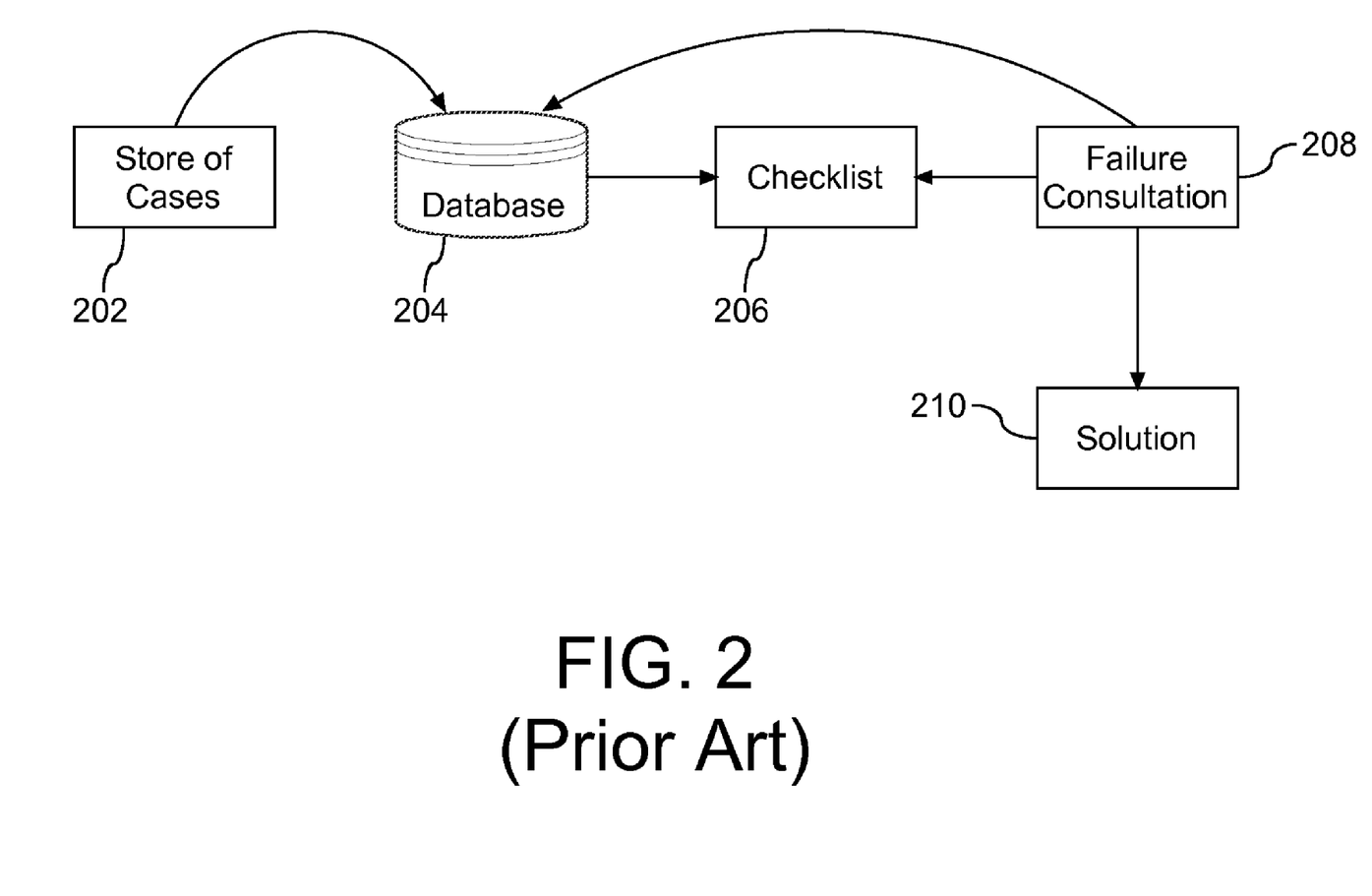
FIG. 2 is a prior art flow diagram illustrating a flow of events for determining problem solutions in an autonomic computing system.

FIG. 2 is a prior art flow diagram (200) illustrating a flow of events for determining problem solutions in an autonomic computing system. Stores of cases of failures that have no relation to defects are shown at (202). In one embodiment, the store of cases (202) includes recommendations or solutions based upon prior experience to provide stable operation of the system. The store of cases (202) is placed in a database (204). The database (204) is in communication with a checklist (206) which functions as a guideline. In response to occurrence of a system failure (208), an information technology support team will review the failure in view of the checklist (206) and the database (204) to provide an effective consultation for system stabilization (210). Over the course of time and based upon future system failures, the database (204) and associated checklist (206) will be updated and grow. The growth of these items will facilitate solution consultation (210) to resolve failures in the system.

Prior art autonomic computer systems are limited to resolving errors associated with software components in the system. However, the prior art does not address application of an autonomic computer system to hardware configuration of the components therein. Failures in a system that affect operability thereof are not limited to software components. Accordingly, there is a need for a solution that analyzes the risk of a failure in the system with respect to configuration of a hardware component prior to the occurrence thereof and to resolve the potential failure prior to a happening of the failure.

In addition, recent developments in the art have developed tools to investigate software configuration parameters as a standard form of practice and un-related to a failure. However, the prior art tools focus on tuning parameters from a product perspective and do not provide advice pertaining to the risk to the entire system. In other words, the most recent developments are on a product-by-product basis for software products operating in a computer system, but do not resolve the issues of one or more products in the system and how the product risk will affect the entire system. Accordingly, there is a need to analyze system stability in it's entirety.

SUMMARY OF THE INVENTION

This invention comprises an article, method, and system to provide an autonomic computer system with respect to configuration of hardware components in the system.

In one aspect of the invention, a method is provided for configuring a computer system to support autonomic problem determination based on system configuration information. A common base event (CBE) is employed to store system configuration information. The configuration information is for a hardware component of the computer system. Symptom rules associated with the configuration information are stored in a symptom database. The symptom database is searched to match the stored problem cases with the stored configuration information. A predicted problem based on the configuration information is provided as output prior to occurrence of a failure in the system.

In another aspect of the invention, a computer system is provided with a server in communication with storage media. Both the server and the storage media are in communication with a generic log adapter that communicates a common base event (CBE) to a log and trace analyzer. The common base event stores hardware configuration information for both the server and storage media. A symptom database is provided in communication with the log and trace analyzer. The symptom database stores symptom rules of the configuration information for both the server and the storage media. A manager is provided to search the symptom database and to match the stored symptom rules with the stored configuration information. An output device is provided in communication with the manager to receive a predicted problem based on the configuration information prior to occurrence of a failure in the system.

In yet another aspect of the invention, an article is provided with a computer readable carrier including computer program instructions configured to support autonomic problem determination based on system configuration information. Instructions are provided to store system configuration information in a common base event (CBE). The configuration information is for a hardware component of the computer system. In addition, instructions are also provided to store symptom rules associated with the configuration information in a symptom database, Instructions are provided to search the symptom database to match the stored problem cases with the stored configuration information. A predicted problem is provided as data output based on the configuration information prior to occurrence of a failure in the system.

Other features and advantages of this invention will become apparent from the following detailed description of the presently preferred embodiment of the invention, taken in conjunction with the accompanying drawings.

DESCRIPTION OF THE PREFERRED EMBODIMENT

Overview

Although it is known in the art to configure an autonomic computer system to maintain software compatibility in the system, the autonomic computer system does not extend to configuration of hardware elements in the system. In the invention, a mechanism is employed to incorporate management of configuration information for hardware elements in a computer system in an autonomic manner. Configuration information is monitored and configuration changes are captured as an event and translated into common base events (CBEs). Similarly, a set of rules are defined for the configuration information and are stored in a symptom database. The captured CBEs are compared with the symptom rules and any discrepancies between the two elements are communicated to a user prior to occurrence of an error in the system. This enables error in the configuration of hardware elements to be re-configured within parameters supported by the system. Accordingly, autonomic computing is expanded to hardware configuration and associated parameters.

Technical Details

Figure 3:
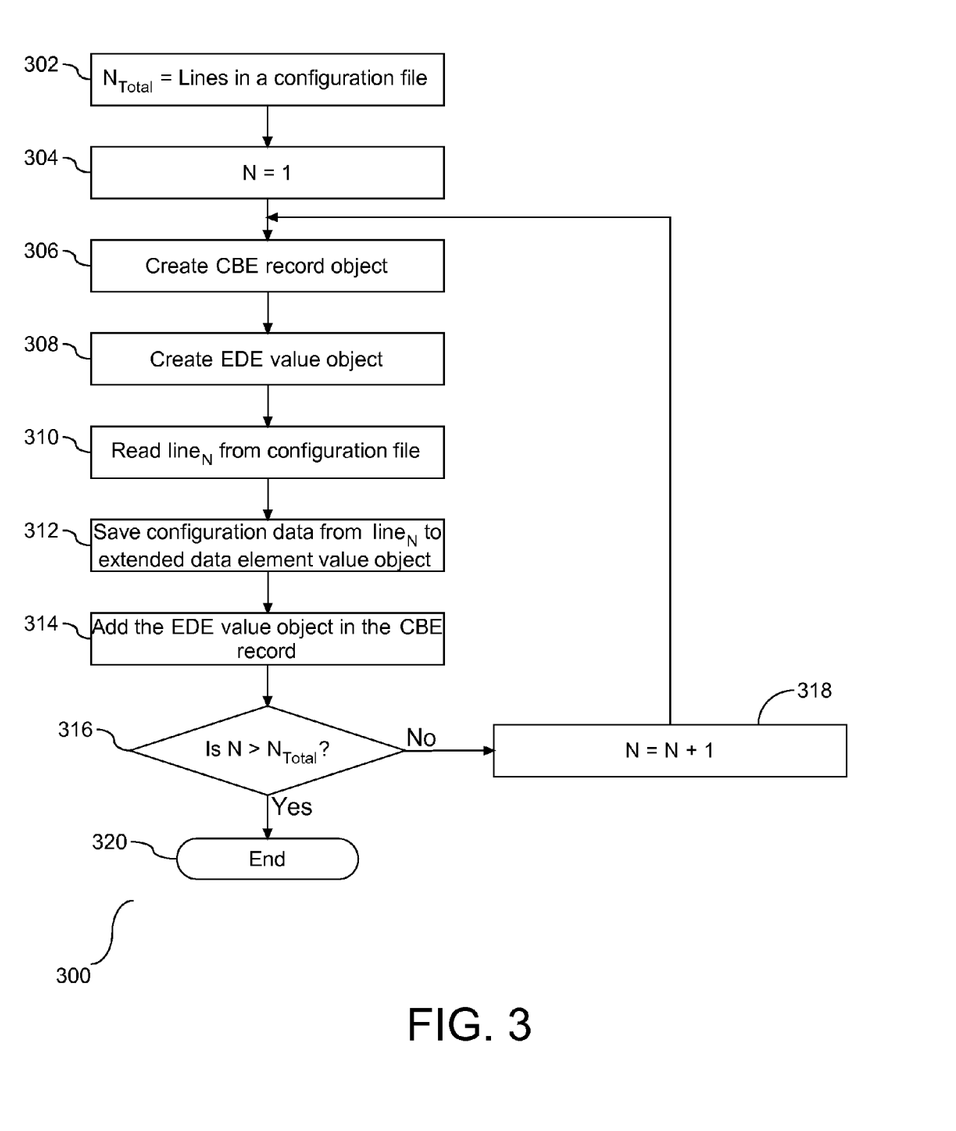
FIG. 3 is a flow chart illustrating a process for transforming configuration information maintained in a configuration file to a common base event (CBE).

FIG. 3 is a flow chart (300) illustrating a process for transforming configuration information maintained in a configuration file to a common base event (CBE). Each CBE contains one or more extended data elements (EDEs), wherein an extended data element is an event definition description that conveys information. Initially, the variable $N_{Total}$ is assigned to the quantity of lines in the configuration file (302), and the variable N is set to the integer one (304). A common base event record object is created (306), followed by creation of an extended data element value object (308). Line$_N$ is read from the configuration file (310), the configuration data from line$_N$ is saved to the extended data element value object (312), and the extended data element value object is added in the common base event record (314). Following step (314), it is determined whether line$_N$ is the last line in the configuration file (316). If it is determined at step (316) that there are more lines in the configuration file to be transformed, the variable N is incremented (318) followed by a return to step (310) to continue evaluation of the configuration file. Alternatively, if it is determined at step (316) that all of the lines in the configuration file have been transformed, the process for transforming a configuration file to a common base event is concluded (320). Accordingly, the transformation process evaluates each line in a configuration file to create a common base event to store configuration information.

In the prior art, the common base event is limited to storing software data. However, as shown in FIG. 3, a common base event record is created to store configuration information for hardware data. The common base event is employed together with the symptom database to determine errors pertaining to configuration of components in the system and to correct the error prior to occurrence of a failure.

Figure 4:
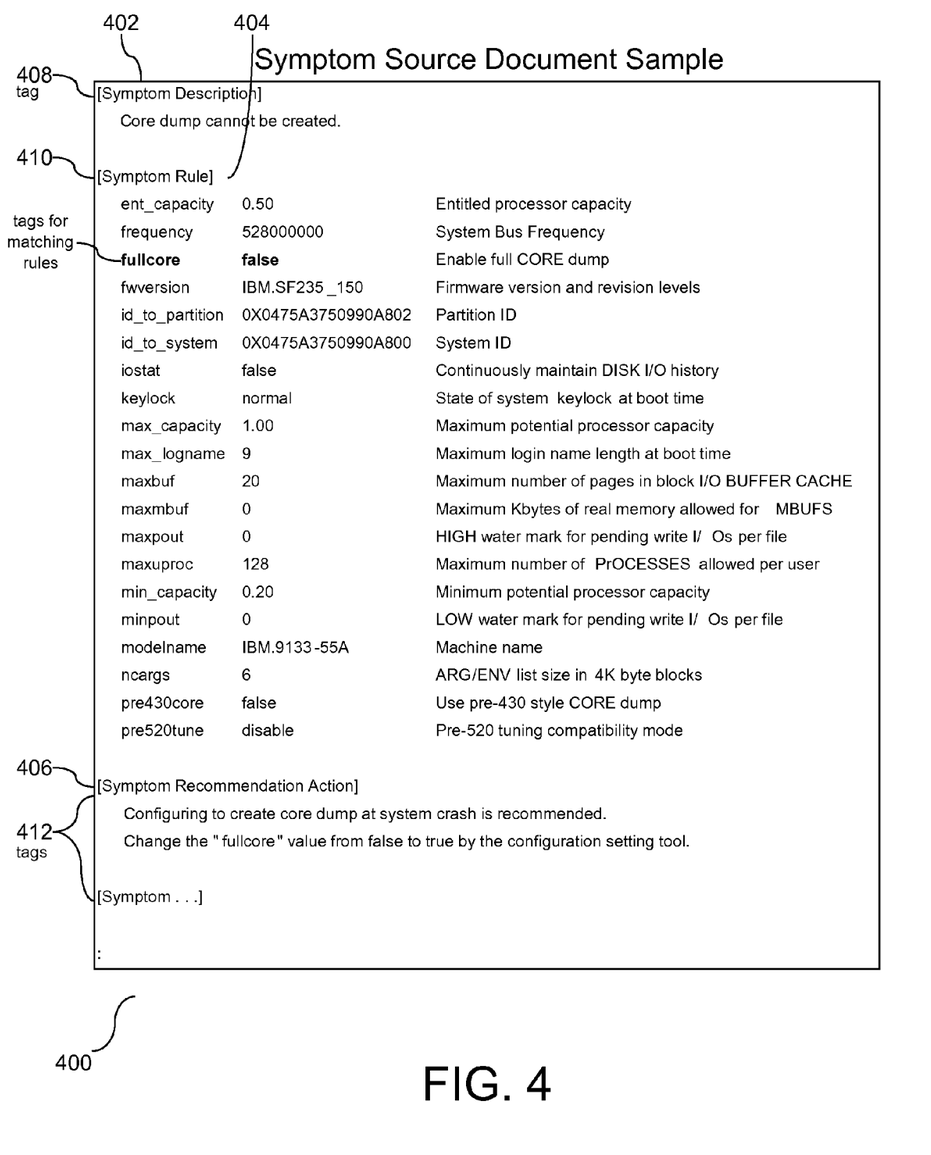
FIG. 4 is an example source document to communicate the system rules to a symptom database.

A symptom is a form of knowledge that indicates a possible problem or situation in the managed environment. In an autonomic computing environment, symptoms are recognized in relation to the monitor components of a control loop and are used as a basis for analysis. Symptoms are based on predefined elements, including definitions and descriptions, provided to an autonomic manager, along with data that a monitoring infrastructure collects from managed resources—such as events. The symptom definition expresses the conditions used by the monitor components to recognize the existence of a symptom, and the symptom description specifies the unique characteristics of a particular symptom that is recognized. Rules that define the symptoms are found in a source document. Symptom rules associated with the configuration information identified in a symptom source document are created and stored in a symptom database. The generated symptom rules do not originate in the symptom database. FIG. 4 is an example source document (400) to communicate the system rules to a symptom database. As shown in the document, there is a system description (402) to identify a problem in the system, a symptom rule (404) to identify the parameters of the tool(s) in the system that are affected by the problem, and a symptom recommendation action (406) for remedial action to avoid the identified problem in the rule or to correct the tool in the system affected by the identified problem. In one embodiment, the symptom source document may include one or more additional symptom rules with an associated symptom recommendation action. Each of the description (402), the symptom rule (404), and the symptom recommendation action (406) has a tag associated therewith. More specifically, tag (408) is shown for the symptom description; tag (410) is shown for the symptom rule; and tag (412) is shown for the symptom recommendation action. Accordingly, tags are embedded into the source document to facilitate creation of symptom rules for the symptom database.

Figure 5:
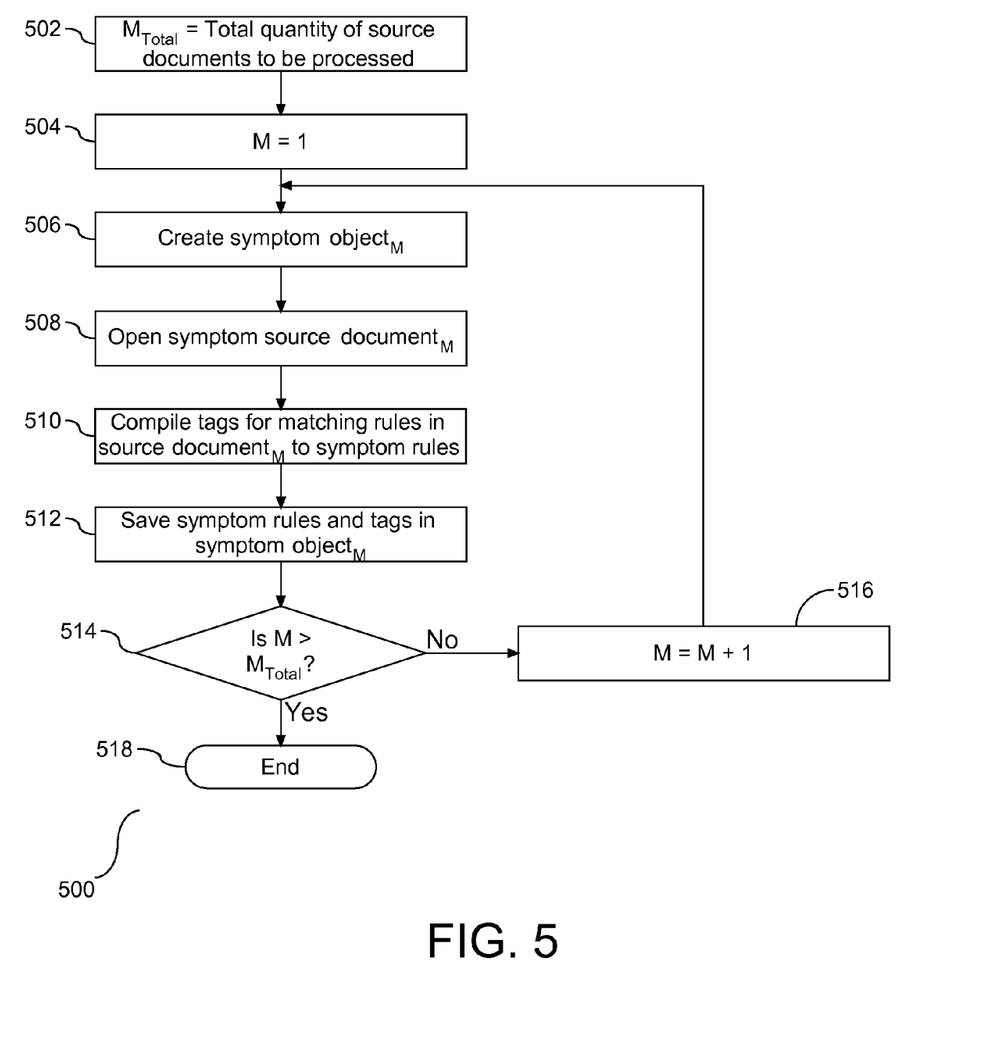
FIG. 5 is a flow chart illustrating a process for creating symptom rules from a source document.

FIG. 5 is a flow chart (500) illustrating a process for creating symptom rules from a source document. The variable $M_{Total}$ is assigned to the total quantity of source documents to be processed (502). The variable M which is associated with source documents is set to the integer one (504). A symptom object$_M$ is created (506). Thereafter, a symptom source document$_M$ is opened (508). Tags for matching rules in the source document$_M$ are compiled into symptom rules (510). In one embodiment, the symptom rules in the source document are compiled to align with the symptom recommendation action. The symptom rules and other tags are then saved in the symptom object$_M$ (512) created at step (506). Accordingly, for each source document a symptom object is create to store a compilation of tags and associated symptom rules.

Following step (512), it is determined whether there are additional source documents that need to have the rules and recommended actions parsed and organized into a symptom object (514). In one embodiment, the determination at step (514) may be in the form of determining if the value of the variable M is greater than the value assigned to the variable $M_{total}$. If it is determined at step (514) that there are more source documents to be reviewed and parsed, the variable M is incremented (516) followed by a return to step (506) to create a symptom object$_M$. However, if it is determined at step (514) that all of the source documents have been processed, then the process for parsing the symptom rules and symptom recommendation actions from the source documents is completed (518). Accordingly, the process outlined herein parses the tags for the symptom rules and associated recommendation actions from each source document into a symptom object, wherein a single symptom object is associated with a single source document.

Figure 6:
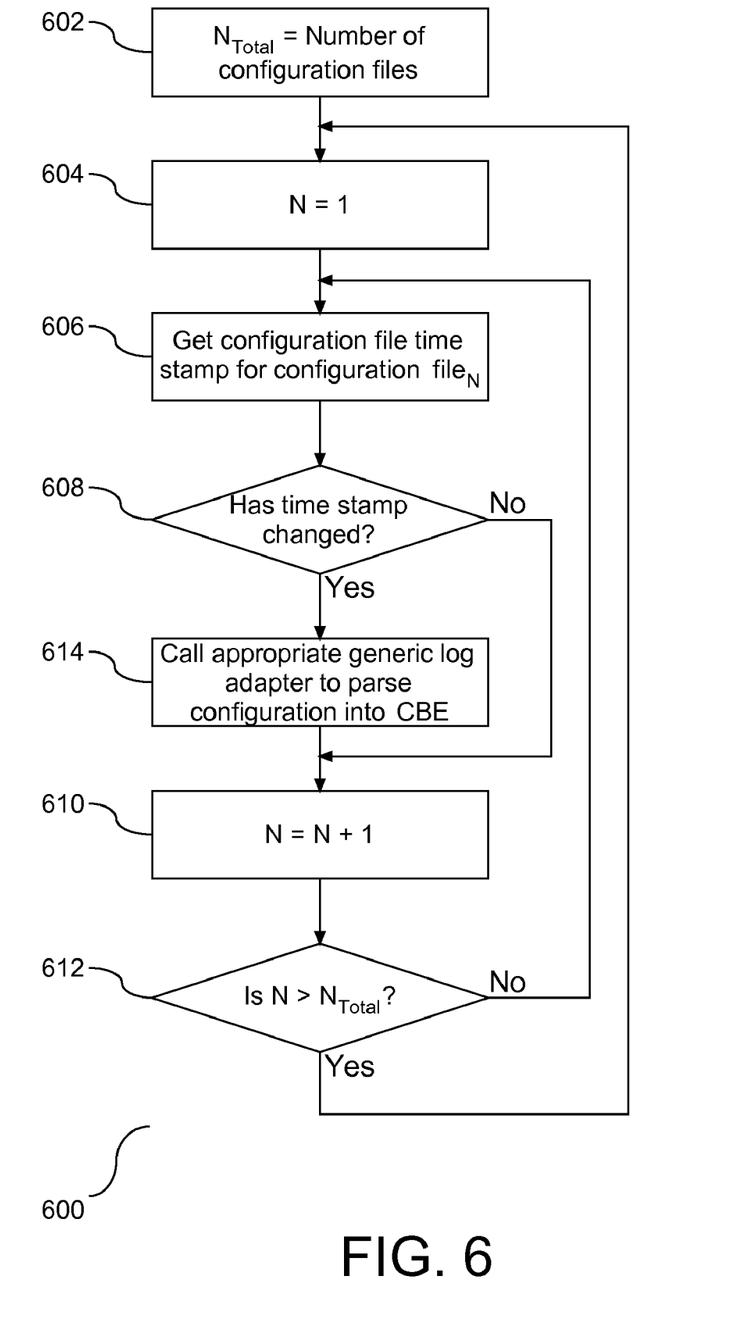
FIG. 6 is a flow chart illustrating changes to a configuration file for configuration of components in the system following creation of the CBE(s) for the associated file.

As it is known in the art, computer systems with their associated files and filesystems are not static. This extends to configuration of hardware elements in the system. FIG. 6 is a flow chart (600) that addresses changes to a configuration file for configuration of components in the system following creation of the CBE(s) for the associated file. Each file has metadata that includes a timestamp that pertains to the last update of a parameter setting file, also known as a configuration file. The time stamp is in the file system of the operating system. Periodically the configuration files are monitored to determine if there have been changes made to the file(s) by reviewing the time stamp metadata. The variable $N_{Ttotal}$ is assigned to the quantity of configuration files in the system (602), and the variable N is assigned to the integer value of one (604). The configuration file time stamp for configuration file$_N$ is ascertained from the file metadata (606). Following step (606), a determination is conducted as to whether the time stamp ascertained at step (606) has changed (608). In one embodiment, the determination at step (608) may include a comparison of the current time stamp to the configuration file with a previous time stamp for the same file. A positive response to the determination at step (608) is followed by calling of the generic log adaptor to parse the changes to the configuration file into the appropriate CBE (614). However, if the response to the determination at step (608) is negative or following step (614), the variable N is incremented (610) following by a test to determine if there are any additional configuration files in the sequence of files to be reviewed for a time stamp change (612). In one embodiment, the determination at step (612) includes a test to determine if the integer assigned to the variable N is greater than the integer assigned to the variable $N_{Total}$. If the response to the determination at step (612) is negative, the process returns to step (606). However, if the response to the determination at step (612) is positive, the process returns to step (604). The return to step (604) in the manner described allows for a set amount of time to elapse before the process returns to monitor change in the time stamp. Accordingly, as demonstrated herein the metadata of each configuration file is monitored on a periodic basis to determine if there have been changes made to the file, and if so, to document such changes in the appropriate CBE.

Figure 7:
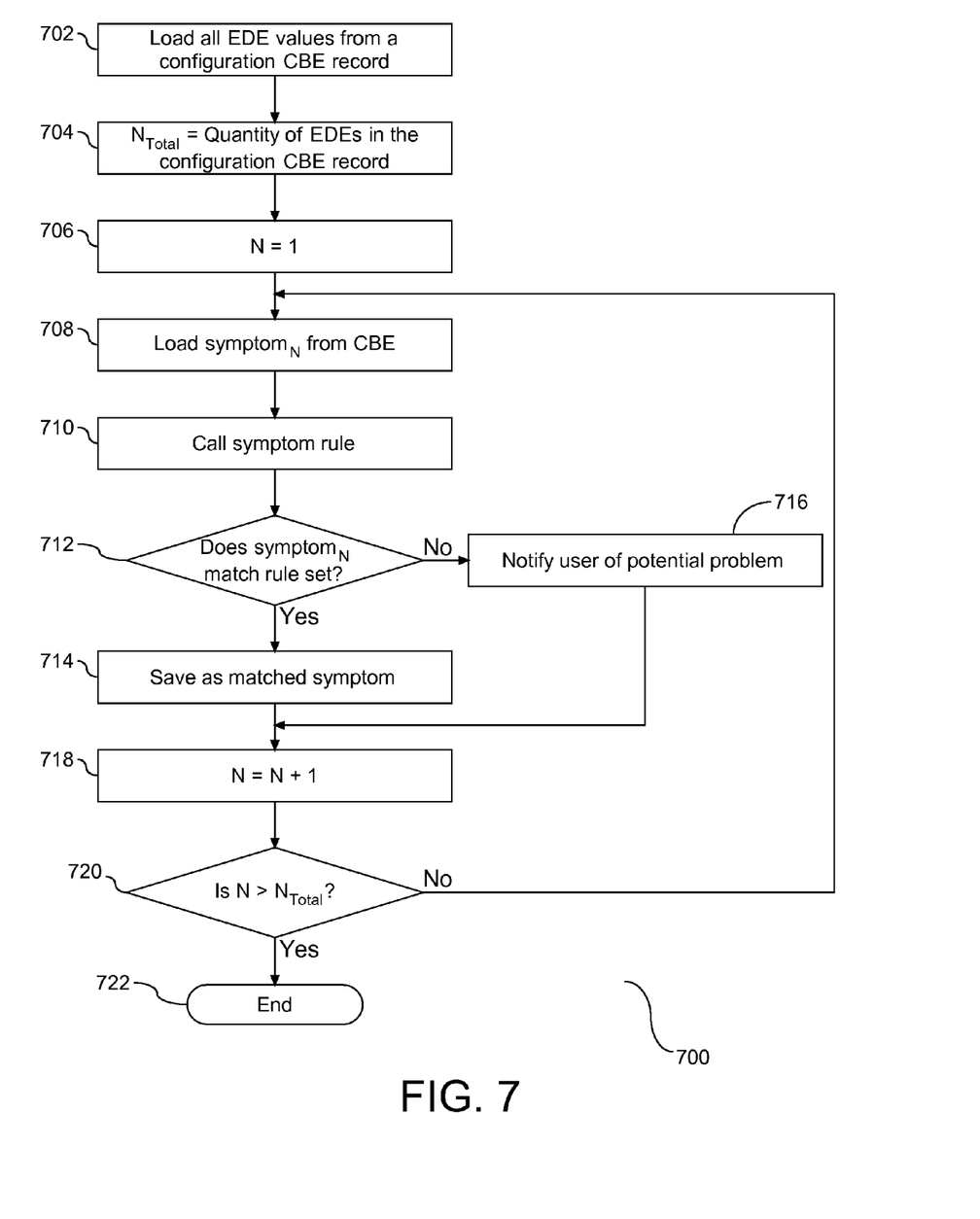
FIG. 7 is a flow chart demonstrating analysis of configuration information.

With the creation of the symptom rules from the source document and the transformation of configuration information to a CBE, the configuration information is analyzed based on the symptom rules in the symptom database. FIG. 7 is a flow chart (700) demonstrating analysis of the configuration information. All EDE values from a configuration CBE record are loaded (702). The variable $N_{Total}$ is assigned to the quantity of EDEs in the configuration CBE record (704), and the variable N is assigned to the integer one (706). Thereafter, a symptom$_N$ is loaded from the CBE (708), followed by calling a symptom rule from the symptom database (710). Details of step (710) are shown in detail in FIG. 8. A determination is then conducted as to whether the symptom$_N$ loaded from the CBE matches the rule set in the symptom database (712). If the response to the determination at step (712) is positive, the loaded symptom is saved as a matched symptom (714). In contrast, if the response to the determination at step (712) is negative, this is an indication that there may be an error or possible error associated with the configuration item assessed, and a user is notified of the potential configuration problem (716). In one embodiment, the message is conveyed to a user on a visual display to communication the potential configuration problem. Following step (714) or step (716), the variable N is incremented (718) and followed by a determination as to whether all of the symptoms in the CBE record have been evaluated (720). A negative response to the determination at step (720) is followed by a return to step (708), and a positive response to the determination at step (720) concludes the analysis for the specified CBE record (722). In one embodiment, the process outlined herein may be repeated for each CBE record. Accordingly, the CBE record is evaluation to determine if there is a conflict between the configuration elements and the rules in the symptom database.

Figure 8:
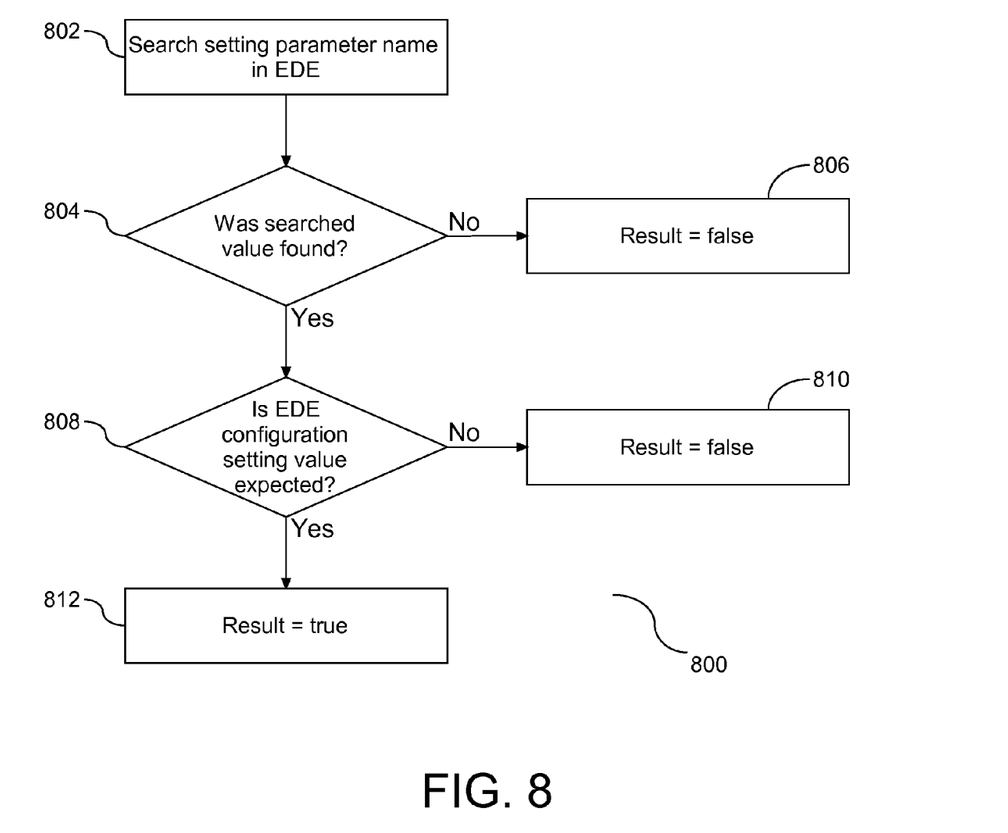
FIG. 8 is a flow chart illustrating a process for generating a symptom rule generated by a symptom generator.

As noted above, FIG. 8 is a flow chart (800) that elaborates on the details of step (710). More specifically, FIG. 8 is an example flow of a symptom rule generated by a symptom generator. This example rule is to detect that the fullcore setting is false in the configuration data. However, the invention should not be limited to the example rule shown herein, and in fact, may be expanded to evaluation any rule associated with configuration information. The setting parameter name in the EDE is searched (802). Since EDE values are stored in the CBE, and therefore the search takes place in the CBE. Thereafter, a determination is conducted as to whether the searched values were found (804). A negative response to the determination at step (804) will save the result with a Boolean value of false (806). However, a positive response to the determination at step (804) is an indication that the search values are in the CBE, and is followed by a second determination as to whether the configuration setting in the EDE value is an expected value (808). In one embodiment, the determination at step (808) includes ascertaining if the configuration settings are appropriate, and therefore the EDE configuration setting value may be compared to a range of values that are acceptable. If it is determined at step (808) that the EDE configuration setting is not within the range of acceptable values, the response to the determination at step (808) is negative and the result is assigned the Boolean value of false (810). Similarly, if it is determined at step (808) that the EDE configuration setting is within the range of acceptable values, the response to the determination at step (808) is positive and the result is assigned the Boolean value of true (812). The results saved at step (810) or (812) are then returned to step (710) so that they may be applied to the determination as to whether the symptom matched the rule.

Figure 9:
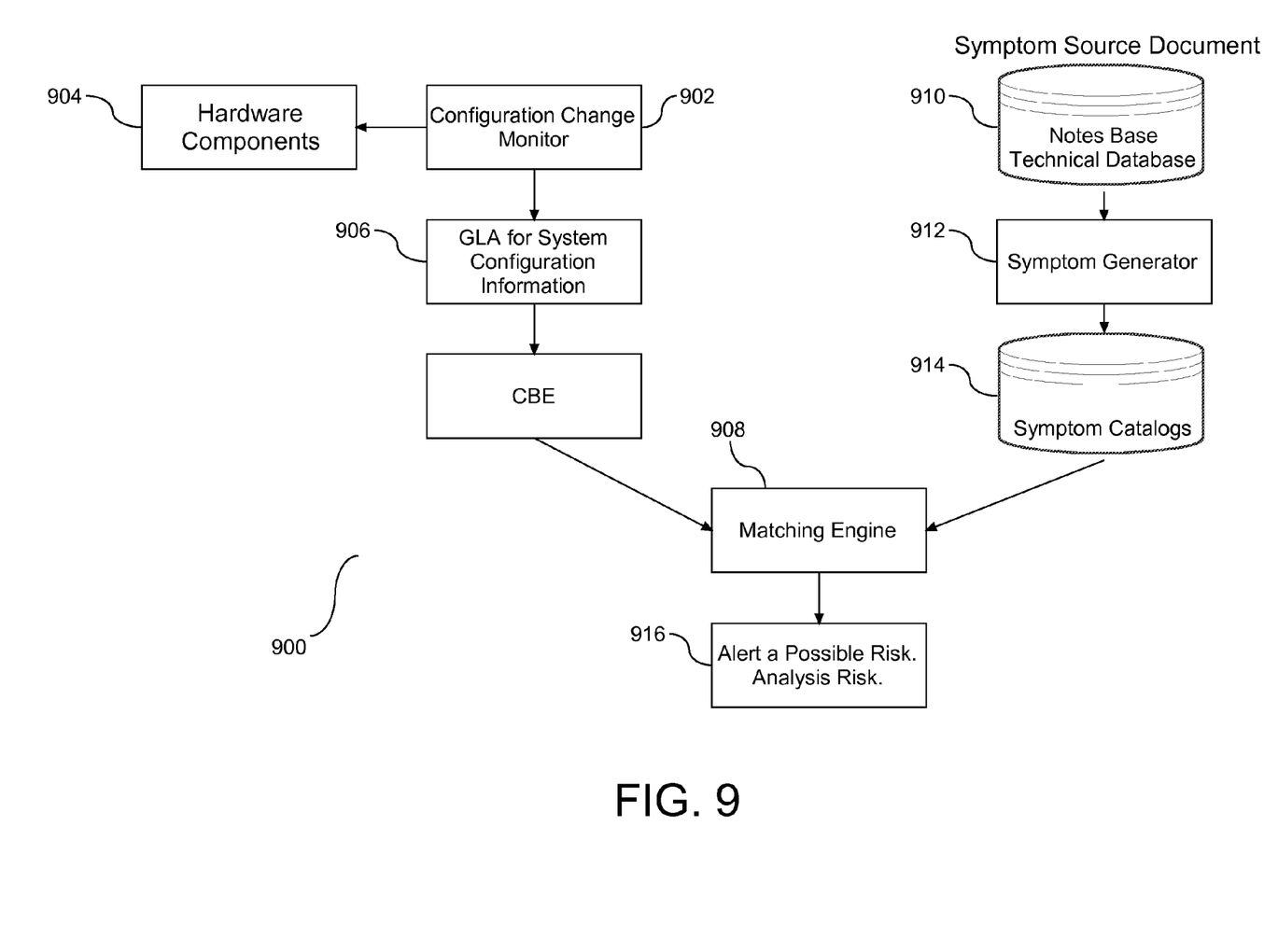
FIG. 9 is a flow diagram illustrating application of components disclosed above into a single system to evaluate configuration information in an autonomic manner according to the preferred embodiment of this invention, and is suggested for printing on the first page of the issued patent.

FIG. 9 is a flow diagram (900) illustrating the application of the different components disclosed above into a single system to evaluation configuration information in an autonomic manner. As shown, a tool (902) is employed to monitor changes to system configuration. The details of the monitor are shown in FIG. 5. The tool (902) is in communication with both the hardware components (904) and the GLA (906). The tool (902) calls the GLA to transform configuration information to a CBE (906). Details of the process for transforming configuration information to a CBE are shown in detail in FIG. 3. The CBEs are entered into a match engine (908) to determine if the CBEs and associated configuration EDEs match the rules of the symptom database, as shown in detail in FIG. 6. Similarly, as shown herein, a symptom source document is created (910) to delineate possible risk from configuration elements, such as misuse of a hardware element, a parameter combination, and/or other configuration elements. The source document is parsed to create one or more rules matching the symptoms (912). Details of the process for parsing the source document are shown in FIG. 4. The symptom rules are collated and organized into the symptom database (914). Based upon the rules in the symptom database, and the CBEs generated for the configuration information, the match engine (908) conducts a comparison and sends a communication if the evaluated CBEs do not match the rules in the symptom database (916). In one embodiment, the CBE configuration information and the rules in the symptom database are analyzed using a log trace analyzer.

The following is an example analysis of configuration information prior to an error:

Example 1

The default database lock timeout setting is set to infinite. If a user would forward a transaction to the database with that setting, the application would hang. The solution is to classify the configuration information of the lock timeout into the CBE, create a symptom in the symptom database, and compare the CBE to the symptom.

Figure 10:
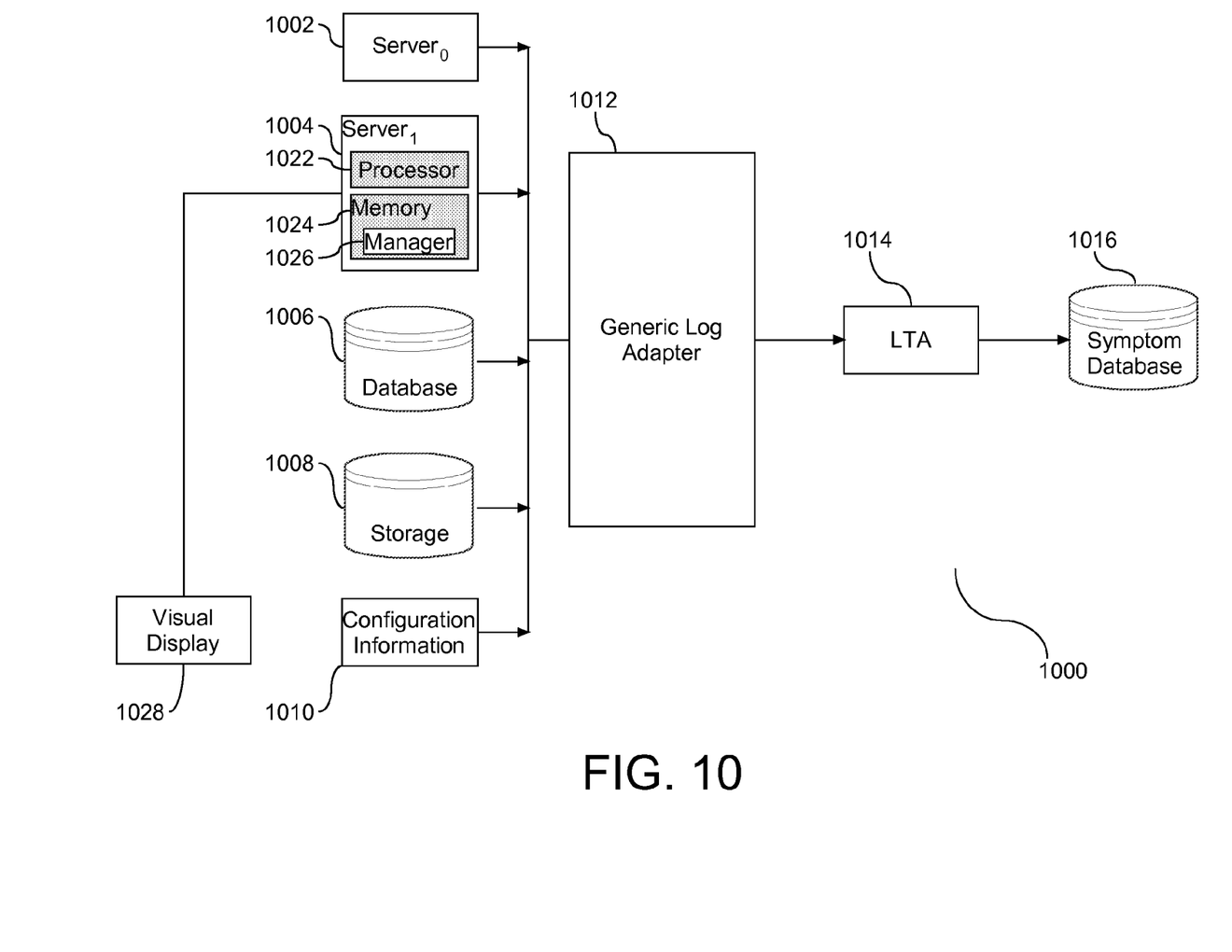
FIG. 10 is a block diagram of the hardware components associated with autonomic computing pertaining to configuration of hardware components.

FIG. 10 is a block diagram (1000) of the hardware components associated with autonomic computing and CBEs. The hardware components shown herein include two servers (1002) and (1004), a database (1006), storage media (1008), and configuration information (1010). Each of the hardware components (1002)-(1008) and the configuration information (1010) are in communication with a generic log adaptor (GLA) (1012). The GLA (1012) prepares logs for use by the log and trace analyzer (LTA) (1014).

The LTA (1014) is shown in communication with a symptom database (1016). The symptom database (1016) is a file of symptoms, string match patterns, associated solutions, and directives. The database (1016) is used in the analysis of event and error messages that may occur in a log. In one embodiment, the database (1016) records incidents and problem indications that could arise in the operation of the software or hardware infrastructure. For every symptom, the symptom database (1016) also contains the cause of the problem and a recommended solution for the problem. In one embodiment, a symptom is an error or event message. It may have a solution associated with it in the symptom database. A solution is information about why an error or an event may have occurred and how to recover from it. Log records can be analyzed using a symptom database to interpret known events and error conditions, and to get detailed information on error resolution.

One of the servers (1004) is shown in detail with a processor (1022) and memory (1024). The server is also shown in communication with an output device (1028) in the form of a visual display. However, the invention should not be limited to the output device in the form of a visual display. In one embodiment, the output device may be a printer or alternative output device. A manager (1026) is shown residing in memory (1024). The manager (1026) is responsible for searching the symptom database and matching stored symptom rules with stored configuration information. Either the output device (1026) or the visual display (1028), or both, may be used to convey a predicted problem based on the configuration information analysis prior to occurrence of a failure in the system. Although the manager (1026) is shown residing in memory (1022), the invention should not be limited to the manager as a software element. In one embodiment, the manager (1026) may reside external to the memory (1022) and may be in the form of a hardware tool within the server to maintain the autonomic characteristics of the system with respect to configuration of components therein.

Embodiments within the scope of the present invention also include articles of manufacture comprising program storage means having encoded therein program code. Such program storage means can be any available media which can be accessed by a general purpose or special purpose computer. By way of example, and not limitation, such program storage means can include RAM, ROM, EPROM, CD-ROM, or other optical disk storage, magnetic disk storage or other magnetic storage devices, or any other medium which can be used to store the desired program code means and which can be accessed by a general purpose or special purpose computer. Combinations of the above should also be included in the scope of the program storage means.

The medium can be an electronic, magnetic, optical, electromagnetic, infrared, or semiconductor system (or apparatus or device) or a propagation medium. Examples of a computer-readable medium include but are not limited to a semiconductor or solid state memory, magnetic tape, a removable computer diskette, random access memory (RAM), read-only memory (ROM), a rigid magnetic disk, and an optical disk. Current examples of optical disks include compact disk B read only (CD-ROM), compact disk B read/write (CD-R/W) and DVD.

A data processing system suitable for storing and/or executing program code includes at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks.

The software implementation can take the form of a computer program product accessible from a computer-useable or computer-readable medium providing program code for use by or in connection with a computer or any instruction execution system.

Advantages Over the Prior Art

Configuration information is captured as one or more events. The configuration information is analyzed by recording configuration information in a CBE and comparing the recorded CBE data to a set of rules in the symptom database. The purpose is to ascertain configuration changes, including hardware configuration, parameter files that sets the behavior of the operating system and middleware, etc. Captured configuration changes are used for analysis to prevent problems from occurring. Problems are classified into symptoms based information to provide pattern matching using logs and trace data provided by products or application. Risks to the system are analyzed in advance and used as a preventive measure for potential problems. Customer configuration information is added to a problem analysis by conventional logging to provide a more refined and precise problem determination.

Alternative Embodiments

It will be appreciated that, although specific embodiments of the invention have been described herein for purposes of illustration, various modifications may be made without departing from the spirit and scope of the invention. In particular, a shell program may be configured to periodically monitor configuration files in the system. Additionally, as noted above, a communication is generated when there is a discrepancy between the rule and the CBE data. In one embodiment, the value of the CBE may be placed in a hierarchy and assigned a category based upon its placement in the hierarchy. The value is indicative as to the strength of the discrepancy, such as whether it is severe, moderate, or relatively benign. Furthermore, in one embodiment, the symptom rules can be written in JAVA. Configuration information is different from event information. However, by parsing the configuration information using CBEs, the configuration information can be applied to current and future system stabilization. Accordingly, the scope of protection of this invention is limited only by the following claims and their equivalents.

We claim:

1. A method for configuring a computer system to support autonomic problem determination based on system configuration information, comprising:
   periodically monitoring configuration files to determine changes to each of the files;
   generating and storing common base events based upon changes in configuration information of hardware elements of said computer system, said changes reflected in said configuration files;
   storing symptom rules associated with configuration information in a symptom database;
   searching the symptom database to match said stored problem cases with said stored common base events; and
   outputting a predicted problem based on said common base events prior to occurrence of a failure in said system.

2. The method of claim 1, further comprising storing configuration information in said common base event.

3. The method of claim 1, further comprising initiating searching the symptom database as a response to input of configuration information.

4. The method of claim 1, further comprising initiating searching the symptom database as a response to a change in previously input configuration information.

5. The method of claim 1, further comprising matching CBE configuration information and said symptom database using a log trace analyzer.

6. The method of claim 1, wherein said symptom rules are written in JAVA programming language.

7. A computer system comprising:
   a server in communication with storage media;
   said server and storage media in communication with a generic log adapter to communicate a common base event (CBE) to a log and trace analyzer;
   a manager to periodically monitor configuration files to determine changes to each of the files:
   said common base event to store changes in hardware configuration information for said server and storage media, said changes reflected in said configuration files;
   a symptom database in communication with said log and trace analyzer, said symptom database to store symptom rules of said configuration information for said server and storage media;
   said manager to search said symptom database and match said stored symptom rules with said common base events; and
   an output device to receive a predicted problem based on said common base events prior to occurrence of a failure in said system.

8. The system of claim 7, further comprising a common base event to stored said configuration information.

9. The system of claim 7, further comprising said manager to initiate a search of said symptom database as a response to input of configuration information.

10. The system of claim 7, further comprising said manager to initiate a search of said symptom database as a response to a change in previously input configuration information.

11. The system of claim 7, further comprising said manager to match CBE configuration information and said symptom database using a log trace analyzer.

12. The system of claim 7, wherein said symptom rules are written in JAVA programming language.

13. An article comprising:
   a computer readable data storage medium including computer program instructions to support autonomic problem determination based on system configuration information, said instructions comprising:
   instructions to periodically monitor configuration files to determine changes to each of the files;
   instructions to store changes in hardware configuration information of a computer system in a common base event (CBE), said changes reflected in said configuration files;
   instructions to store symptom rules associated with said CBE in a symptom database;
   instructions to search the symptom database to match said stored problem cases with said stored CBE; and
   output of a predicted problem on said CBE prior to occurrence of a failure in said system.

14. The article of claim 13, further comprising instructions to store configuration information in said common base event.

15. The article of claim 13, further comprising instructions to initiate searching the symptom database as a response to input of configuration information.

16. The article of claim 13, further comprising instructions to initiate searching the symptom database as a response to a change in previously input configuration information.

17. The article of claim 13, further comprising instructions to match CBE configuration information and said symptom database using a log trace analyzer.

18. The article of claim 13, wherein said symptom rules are written in JAVA programming language.

* * * * *